US010812290B2

(12) United States Patent
Iwata et al.

(10) Patent No.: US 10,812,290 B2
(45) Date of Patent: *Oct. 20, 2020

(54) ON-VEHICLE COMMUNICATION SYSTEM, SWITCHING DEVICE AND ON-VEHICLE COMMUNICATION METHOD

(71) Applicants: SUMITOMO ELECTRIC INDUSTRIES, LTD., Osaka (JP); AUTONETWORKS TECHNOLOGIES, LTD., Mie (JP); SUMITOMO WIRING SYSTEMS, LTD., Mie (JP)

(72) Inventors: Akihito Iwata, Osaka (JP); Hirofumi Urayama, Osaka (JP); Akihiro Ogawa, Osaka (JP); Takeshi Hagihara, Mie (JP); Yasuhiro Yabuuchi, Mie (JP)

(73) Assignees: Sumitomo Electric Industries, Ltd., Osaka-shi (JP); AutoNetworks Technologies, Ltd., Yokkaichi (JP); Sumitomo Wiring Systems, Ltd., Yokkaichi (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/337,213

(22) PCT Filed: Jun. 28, 2017

(86) PCT No.: PCT/JP2017/023669
§ 371 (c)(1),
(2) Date: Mar. 27, 2019

(87) PCT Pub. No.: WO2018/061361
PCT Pub. Date: Apr. 5, 2018

(65) Prior Publication Data
US 2019/0229948 A1    Jul. 25, 2019

(30) Foreign Application Priority Data
Sep. 27, 2016   (JP) .................... 2016-187938

(51) Int. Cl.
*H04Q 11/00* (2006.01)
*H04L 12/44* (2006.01)
*B60L 15/42* (2006.01)
*H04L 12/46* (2006.01)
*H04L 12/40* (2006.01)

(52) U.S. Cl.
CPC .............. *H04L 12/44* (2013.01); *B60L 15/42* (2013.01); *H04L 12/40* (2013.01);
(Continued)

(58) Field of Classification Search
CPC ....................... H04B 10/035; H04Q 11/0001
See application file for complete search history.

(56) References Cited

U.S. PATENT DOCUMENTS 6,915,463 B2 * 7/2005 Vieregge ............ H04J 14/0294
398/27
9,325,516 B2    4/2016 Pera et al.
(Continued)

FOREIGN PATENT DOCUMENTS

JP      S60-203034 A    10/1985
JP      2015-088815 A    5/2015
JP      2016-012932 A    1/2016

OTHER PUBLICATIONS

Office Action in U.S. Appl. No. 16/337,160, dated Aug. 21, 2019.
(Continued)

*Primary Examiner* — Shi K Li
(74) *Attorney, Agent, or Firm* — Baker Botts L.L.P.; Michael A. Sartori

(57) ABSTRACT

An on-vehicle communication system mounted on a vehicle comprises a first switching device, a second switching device and a third switching device each including a first communication port and a second communication port. The first communication port and the second communication port of the first switching device are respectively connected to the first communication port of the second switching (Continued)

device and the first communication port of the third switching device, and the second communication port of the second switching device and the second communication port of the third switching device are connected to each other. Each of the first switching device, the second switching device and the third switching device measures a reception signal quality for the first communication port of the device itself and a reception signal quality for the second communication port of the device itself. One of the first communication port and the second communication port is selected as a port for use which should be used for communication in each of the first switching device, the second switching device and the third switching device. Each of the switching devices performs switching processing for determining whether or not the port for use is to be switched to the another one of the first communication port and the second communication port based on the reception signal quality for the first communication port and the second communication port.

7 Claims, 7 Drawing Sheets

(52) U.S. Cl.
CPC ..... *H04L 12/4625* (2013.01); *H04Q 11/0062* (2013.01); *H04L 2012/40273* (2013.01); *H04L 2012/445* (2013.01)

(56) References Cited

U.S. PATENT DOCUMENTS

| 2005/0206530 | A1 | 9/2005 | Cumming et al. |
| 2010/0076615 | A1 | 3/2010 | Daniel et al. |
| 2015/0058652 | A1 | 2/2015 | Dawley et al. |
| 2019/0118744 | A1* | 4/2019 | Takamatsu .......... B60R 16/0215 |
| 2019/0222437 | A1 | 7/2019 | Iwata et al. |

OTHER PUBLICATIONS

Notice of Allowance in U.S. Appl. No. 16/337,160, dated Mar. 5, 2020.

Notice of Allowance in U.S. Appl. No. 16/337,160, dated Jun. 25, 2020.

* cited by examiner

FIG. 4

| TEMPERATURE Ta(°C) | THRESHOLD Th1(dB) |
|---|---|
| −40 | −10.00 |
| −39 | −9.75 |
| ⋮ | ⋮ |
| 4 | −1.68 |
| 5 | −1.60 |
| 6 | −1.52 |
| ⋮ | ⋮ |
| 84 | 19.40 |
| 85 | 20.00 |

ST1

F I G. 7
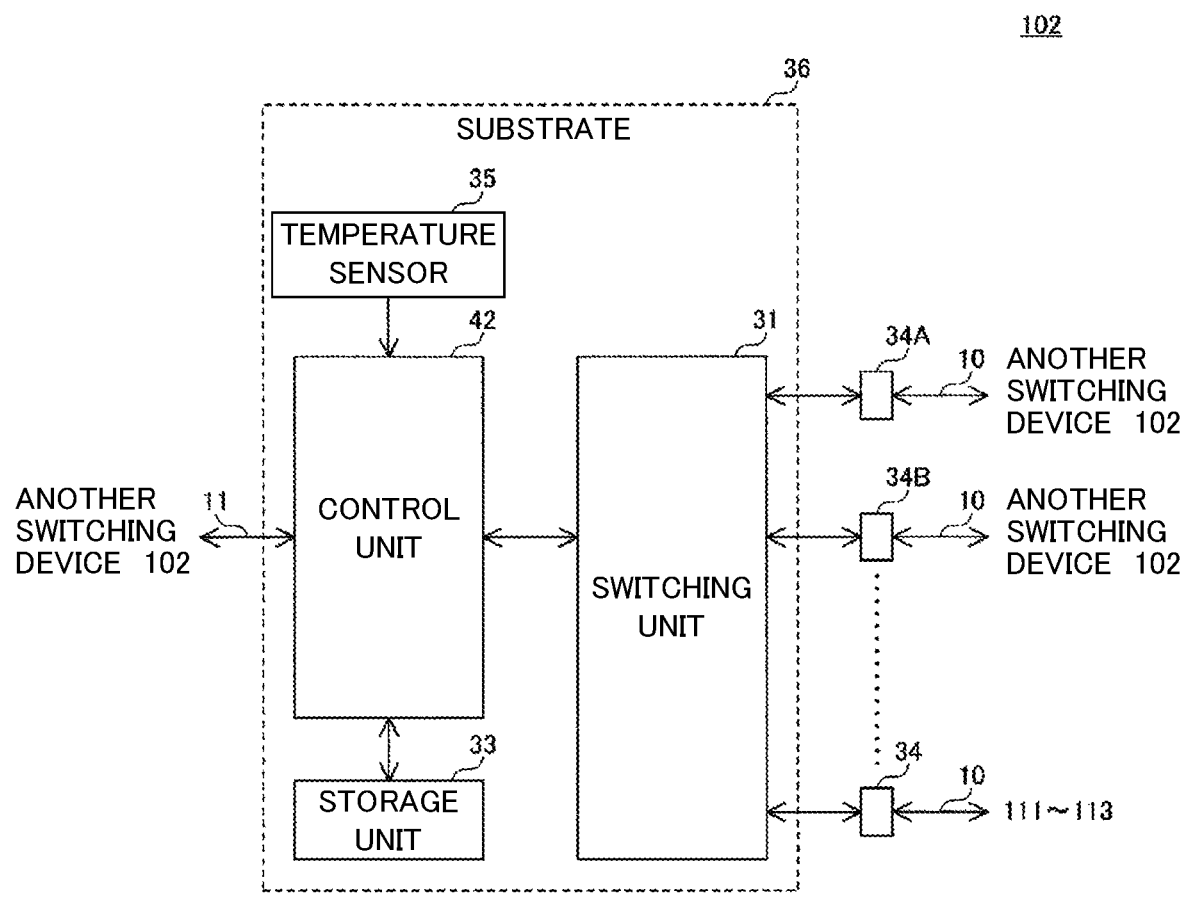

ON-VEHICLE COMMUNICATION SYSTEM, SWITCHING DEVICE AND ON-VEHICLE COMMUNICATION METHOD

CROSS-REFERENCE TO RELATED APPLICATIONS

This application is the national phase under 35 U.S.C. § 371 of PCT International Application No. PCT/JP2017/023669 which has International filing date of Jun. 28, 2017 and designated the United States of America, and is incorporated herein by reference in its entirety.

FIELD

The present technology herein relates to an on-vehicle communication system, a switching device and an on-vehicle communication method.

The present application claims the benefit of Japanese Patent Application No. 2016-187938 filed on Sep. 27, 2016, the entire contents of which are herein incorporated by reference.

BACKGROUND AND SUMMARY

A station side device is disclosed as described below. The station side device includes active (in current use) OSUs 1 to N, standby (spare) OSU N+1 and a control unit. The control unit conveys management information on ONUs linked to a logical line to and from a network management system (NMS). The logical line is defined by a fixed combination of an optical line unit and a passive optical network.

Meanwhile, the OSUs acquire management information linked to a real line. The real line indicates an actual combination of the optical line unit and the passive optical network. The control unit converts a line linked to the management information between the logical line and the real line reciprocally by using mapping information.

(1) An on-vehicle communication system according to the present disclosure is an on-vehicle communication system mounted on a vehicle. The on-vehicle communication system comprises a first switching device, a second switching device and a third switching device each including a first communication port and a second communication port. The first communication port and the second communication port of the first switching device are respectively connected to the first communication port of the second switching device and the first communication port of the third switching device. The second communication port of the second switching device and the second communication port of the third switching device are connected to each other. Each of the first switching device, the second switching device and the third switching device measures a reception signal quality for the first communication port of the device itself and a reception signal quality for the second communication port of the device itself. Each of the first switching device, the second switching device and the third switching device performs switching processing for determining whether or not a port for use that is being selected as a communication port to be used out of the first communication port and the second communication port of the device itself is to be switched to another one of the communication ports based on the reception signal quality for the port for use.

(6) A switching device according to the present disclosure is a switching device mounted on a vehicle. The switching device comprises a plurality of communication ports, a measurement unit that measures a reception signal quality for each of the communication ports, and a switching processing unit that performs switching processing for determining whether or not a port for use that is being selected as a communication port to be used is to be switched to another one of the communication ports based on the reception signal quality measured by the measurement unit for the port for use.

(7) An on-vehicle communication method according to the present disclosure is an on-vehicle communication method in an on-vehicle communication system mounted on a vehicle. The on-vehicle communication system comprises a first switching device, a second switching device and a third switching device each having a first communication port and a second communication port. The first communication port and the second communication port of the first switching device are connected to the first communication port of the second switching device and the first communication port of the third switching device, respectively. The second communication port of the second switching device and the second communication port of the third switching device are connected. The on-vehicle communication method comprises measuring, by each of the first switching device, the second switching device and the third switching device, a reception signal quality for the first communication port of the device itself and a reception signal quality for the second communication port of the device itself, and performing, by each of the first switching device, the second switching device and the third switching device, switching processing for determining whether or not a port for use that is being selected as a communication port to be used out of the first communication port and the second communication port of the device itself is to be switched to another one of the communication ports based on the reception signal quality for the port for use.

One aspect of the present disclosure may be achieved not only as an on-vehicle communication system having such a characteristic processing unit but also as a semiconductor integrated circuit realizing a part or all of the on-vehicle communication system.

One aspect of the present disclosure may be achieved as a switching device having such a characteristic processing unit as well as a method including steps for implementing such characteristic processing, and as a program for causing a computer to execute the steps of such characteristic processing. Moreover, one aspect of the present disclosure may be achieved as a semiconductor integrated circuit realizing a part or all of the switching device.

BRIEF DESCRIPTION OF THE DRAWINGS

FIG. 4 illustrates one example of an SNR table held in a storage unit of the switching device according to Embodiment 1 of the present invention.

FIG. 7 illustrates an example of the configuration of a switching device in the on-vehicle communication system according to Embodiment 2 of the present invention.

DETAILED DESCRIPTION OF NON-LIMITING EXAMPLE EMBODIMENTS

Figure 1:
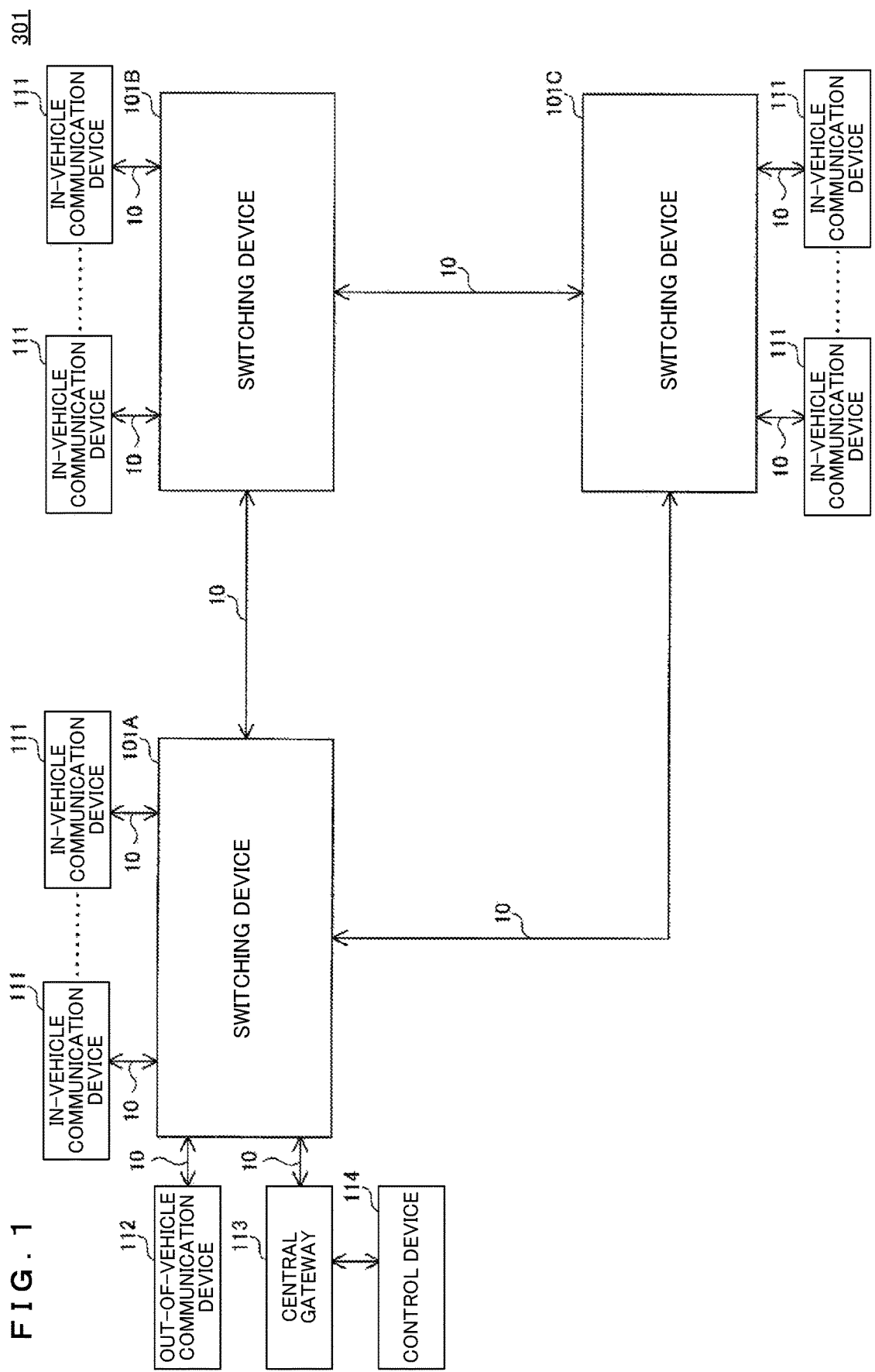
FIG. 1 illustrates an example of the configuration of an on-vehicle communication system according to Embodiment 1 of the present invention.

Conventionally, in order to offer a high quality service, techniques for performing duplication (redundancy) of a system have been developed.

For example, applying the redundant configuration described in Patent Document 1 to an on-vehicle network is conceivable. Due to limitation of space in a vehicle, however, a noise source such as an engine, a motor and so on as well as signal lines may be arranged close to each other.

Such an arrangement may sharply deteriorate a communication environment depending on the operation of the noise source. For example, the noise level of a signal to be transmitted by a signal line rapidly increases, resulting in degradation of communication quality. In this case, communication may be made difficult, which is unpreferable. Thus, a technique is required that is capable of appropriately performing redundant switching in the on-vehicle network depending on the communication environment.

The present disclosure is made to solve the above-described problem, and the object is to provide an on-vehicle communication system, a switching device and an on-vehicle communication method which are capable of appropriately performing redundant switching in an on-vehicle network.

According to the present disclosure, it is possible to appropriately perform redundant switching in an on-vehicle network.

Outlines of embodiments in the present invention are listed and described below.

(1) The on-vehicle communication system according to the embodiments of the present invention is an on-vehicle communication system mounted on a vehicle. The on-vehicle communication system comprises a first switching device, a second switching device and a third switching device each including a first communication port and a second communication port. The first communication port and the second communication port of the first switching device are respectively connected to the first communication port of the second switching device and the first communication port of the third switching device. The second communication port of the second switching device and the second communication port of the third switching device are connected to each other. Each of the first switching device, the second switching device and the third switching device measures a reception signal quality for the first communication port of the device itself and a reception signal quality for the second communication port of the device itself. Each of the first switching device, the second switching device and the third switching device performs switching processing for determining whether or not a port for use that is being selected as a communication port to be used out of the first communication port and the second communication port of the device itself is to be switched to another one of the communication ports based on the reception signal quality for the port for use.

According to such a configuration that the reception signal qualities for the first communication port and the second communication port in each of the switching devices are measured, if deterioration in the reception signal quality of the signal for the port for use is detected due to increase in a noise level it is appropriately determined that the port for use is to be switched to the other communication port, and the port for use can be switched to the other communication port. Redundant switching can appropriately be performed which realizes switching the communication route passing through the port for use to a communication route passing through the other communication port, so that it is possible to prevent a situation where communication continues to be difficult. Accordingly, it is possible to appropriately perform redundant switching in the on-vehicle network.

(2) Preferably, each of the first switching device, the second switching device and the third switching device holds correspondence between a plurality of temperatures of the device itself and judgment criteria in the switching processing as to the reception signal quality, obtains a temperature of itself, and performs the switching processing further based on the obtained temperature and the correspondence.

According to such a configuration, if the lower limit of a signal-to-noise-ratio (SNR) capable of well performing signal processing of a received signal varies depending on the temperature, the criteria of judgment depending on the temperature of the switching device can be obtained from the above-described correspondence. Thus, if it is difficult to well perform the above-described signal processing, it is possible to determine that the port for use is to be switched to the other communication port.

(3) More preferably, each of the first switching device, the second switching device and the third switching device holds the correspondence for each communication port.

According to such a configuration, if the temperature change in the lower limit of the SNR capable of well performing signal processing of a received signal varies from one communication port to another, the criteria of judgment can be obtained from the above-described correspondence depending on the temperature of the switching device for each communication port.

(4) Further preferably, each of the first switching device, the second switching device and the third switching device obtains the reception signal quality and the correspondence for the communication port of another switching device, and performs the switching processing further based on the obtained reception signal quality and the obtained correspondence.

Such a configuration may determine whether or not signal processing of the received signal is well performed in another switching device, so that it is possible to systematically determine which one is superior, the communication route passing through this another switching device to a target switching device or the communication route bypassing this another switching device and reaching the target switching device.

(5) More preferably, the communication ports of the first switching device, the second switching device and the third switching device are connected with one another through cables for Ethernet (registered trademark) communication, and the first switching device, the second switching device and the third switching device are further connected with one another through cables for serial communication.

According to such a configuration, the reception signal quality and the above-described correspondence for the communication port of another switching device can be surely obtained through the dedicated serial communication cables, which enables prompt switching processing.

(6) The switching device according to the embodiments of the present invention is a switching device mounted on a vehicle. The switching device comprises a plurality of communication ports, a measurement unit that measures a reception signal quality for each of the communication ports, and a switching processing unit that performs switching processing for determining whether or not a port for use that is being selected as a communication port to be used is to be switched to another one of the communication ports based on the reception signal quality measured by the measurement unit for the port for use.

According to such a configuration that the reception signal qualities of signals for the communication ports of each of the switching devices are measured, if deterioration in the reception signal quality of the signal for the port for use is detected due to increase in a noise level, by appropriately determining that the port for use is to be switched to this another one of the communication ports, the port for use can be switched to this another one of the communication ports. The redundant switching for switching from the communication route passing through the port to be used to a communication route passing through another communication port can appropriately be performed, which makes it possible to prevent a situation where communication continues to be difficult. Accordingly, it is possible to appropriately perform redundant switching in the on-vehicle network.

(7) The on-vehicle communication method according to the embodiments of the present invention is an on-vehicle communication method in an on-vehicle communication system mounted on a vehicle. The on-vehicle communication system comprises a first switching device, a second switching device and a third switching device each having a first communication port and a second communication port. The first communication port and the second communication port of the first switching device are connected to the first communication port of the second switching device and the first communication port of the third switching device, respectively. The second communication port of the second switching device and the second communication port of the third switching device are connected. The on-vehicle communication method comprises measuring, by each of the first switching device, the second switching device and the third switching device, a reception signal quality for the first communication port of the device itself and a reception signal quality for the second communication port of the device itself, and performing, by each of the first switching device, the second switching device and the third switching device, switching processing for determining whether or not a port for use that is being selected as a communication port to be used out of the first communication port and the second communication port of the device itself is to be switched to another one of the communication ports based on the reception signal quality for the port for use.

According to such a configuration that the reception signal qualities for the first communication port and the second communication port in each of the switching devices are measured, if deterioration in the reception signal quality of the signal for the port for use is detected due to increase in a noise level, it is appropriately determined that the port for use is to be switched to the other communication port, the port for use can be switched to the other communication port. The redundant switching for switching from the communication route passing through the port for use to a communication route passing through the other communication port can appropriately be performed, which makes it possible to prevent a situation where communication continues to be difficult. Accordingly, it is possible to appropriately perform redundant switching in the on-vehicle network.

The embodiments of the present invention will be described below with reference to the drawings thereof. It is noted that the same or corresponding parts are denoted by the same reference codes in the drawings to avoid repetitive descriptions.

Furthermore, at least parts of the embodiments described below may arbitrarily be combined.

Embodiment 1

[Configuration and Basic Operation]

FIG. 1 illustrates an example of the configuration of an on-vehicle communication system according to Embodiment 1 of the present invention.

Referring to FIG. 1, an on-vehicle communication system 301 includes switching devices 101A, 101B and 101C. Hereafter, each of the switching devices 101A, 101B and 101C is also called a switching device 101.

The on-vehicle communication system 301 is mounted on a vehicle. Multiple in-vehicle communication devices 111, an out-of-vehicle communication device 112, a central gateway 113 and a control device 114, for example, are mounted on the vehicle.

Note that the vehicle may be mounted with a single in-vehicle communication device 111 without being limited to the multiple in-vehicle communication devices 111. Furthermore, the vehicle may be mounted with multiple out-of-vehicle communication devices 112 without being limited to a single out-of-vehicle communication device 112.

The in-vehicle communication device 111 is, for example, a human machine interface, a camera, a sensor, a navigation device and so on, and is able to communicate with the switching device 101.

The out-of-vehicle communication device 112 can, for example, wirelessly communicate with a radio base station device (not illustrated) in compliance with a communication standard such as a long term evolution (LTE), 3G or the like and communicate with the switching device 101A.

The control device 114 is, for example, an engine control unit, an automatic transmission (AT) control unit, a hybrid electric vehicle (HEV) control unit, a brake control unit, a chassis control unit, a steering control unit and so on.

The central gateway 113 can communicate with the control device 114 via a controller area network (CAN) and communicate with the switching device 101A.

The central gateway 113 performs relay processing of information exchanged between the control device 114 and the in-vehicle communication device 111 as well as the out-of-vehicle communication device 112.

Note that in the on-vehicle communication system 301, the out-of-vehicle communication device 112 and the central gateway 113 are configured to, but not limited to, be directly connected to the switching device 101A. The out-of-vehicle communication device 112 and the central gateway 113 may be directly connected to separate switching devices 101 respectively.

The switching devices 101A-101C are connected with one another through on-vehicle Ethernet communication cables (hereinafter, also referred to as Ethernet cables) 10. Furthermore, the switching device 101 is connected to the in-vehicle communication device 111, the out-of-vehicle communication device 112 and the central gateway 113 through the Ethernet cables 10, for example.

The switching device 101 can communicate with the in-vehicle communication device 111, the out-of-vehicle communication device 112 and the central gateway 113 that are directly connected to the device itself and can communicate with another switching device 101.

Information is exchanged between the switching device 101 and another device directly connected to this switching device 101 using an Ethernet frame, for example.

The environments of the switching devices 101A-101C are different from one another. More specifically, the switching devices 101A-101C are provided at different positions, such as at a dashboard of the vehicle, at the front and rear portions of the vehicle and so on, so that they have different ambient temperatures.

[Problems]

The Ethernet cables 10 connecting the switching devices 101 are affected by, for example, low-frequency noise from the engine, clock noise from other devices or the like. Such noise may abruptly or constantly occur.

The Ethernet cable 10 may receive noise depending on the arrangement of a noise source and itself. This causes noise to be superposed on signals transmitted and received between the switching devices 101, so that degradation of signal quality may constantly or abruptly occur.

It is difficult for an impedance measuring method normally utilized for detecting a disconnection of a signal line to detect degradation of the signal quality due to noise increase as described above. Thus, redundancy switching of a communication route becomes difficult in the case where degradation occurs in the signal quality.

Hence, the on-vehicle communication system according to the embodiments of the present invention solves such problems by taking the following configuration and operation.

[Configuration of Switching Device 101]

Figure 2:
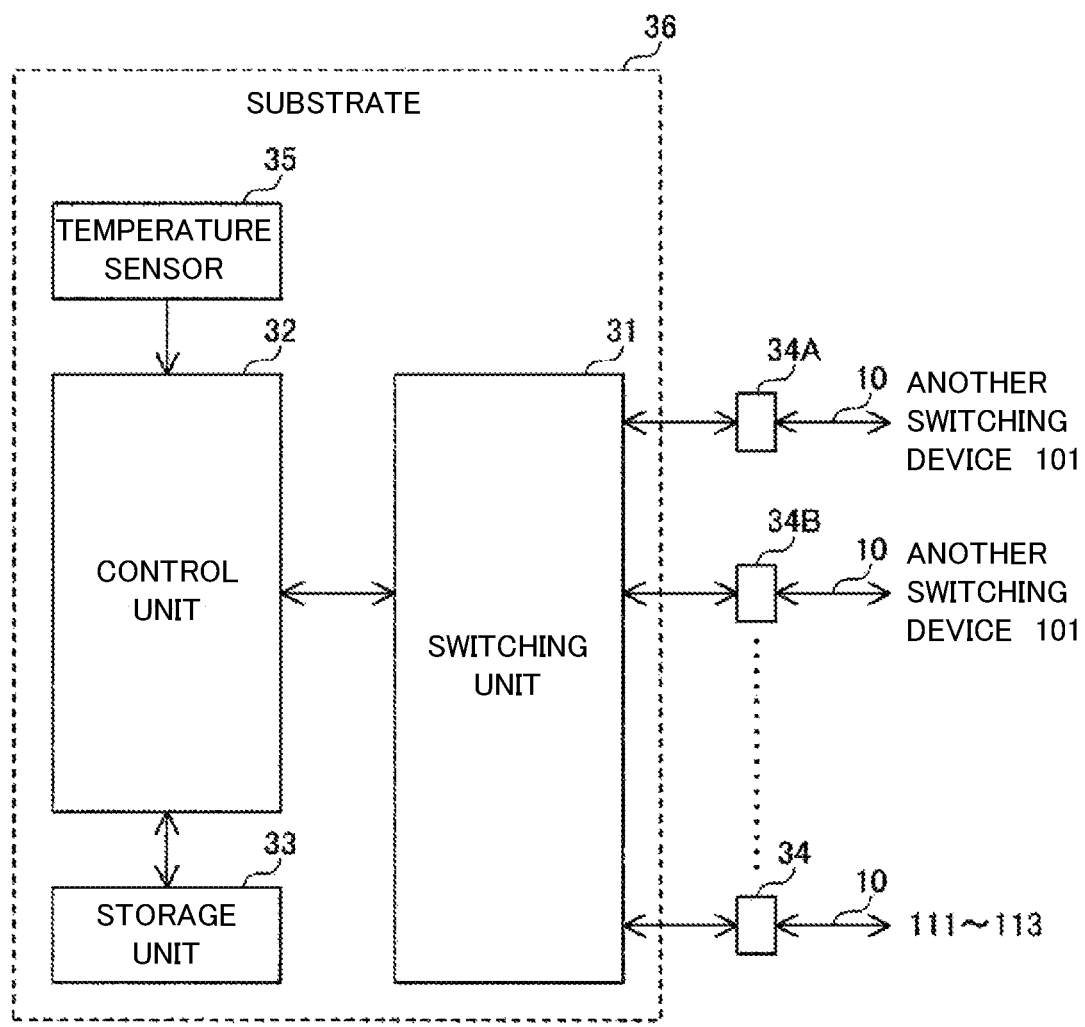
FIG. 2 illustrates an example of the configuration of a switching device in the on-vehicle communication system according to Embodiment 1 of the present invention.

FIG. 2 illustrates an example of the configuration of a switching device in the on-vehicle communication system according to Embodiment 1 of the present invention.

Referring to FIG. 2, the switching device 101 includes a switching unit (measurement unit) 31, a control unit (switching processing unit) 32, a storage unit 33, multiple communication ports 34 and a temperature sensor 35.

The switching unit 31, the control unit 32, the storage unit 33 and the temperature sensor 35 are provided on a substrate 36. Note that at least one of the switching unit 31, the control unit 32, the storage unit 33 and the temperature sensor 35 may be provided on a different substrate.

The temperature sensor 35 measures the temperature Ta of the substrate 36 and periodically, for example, outputs temperature information indicating the result of the measurement to the control unit 32.

The communication port 34 is a terminal to which an Ethernet cable 10, for example, can be connected. Note that the communication port 34 may be a terminal of an integrated circuit.

The Ethernet cable 10 is connected to each of the communication ports 34. More specifically, the communication port 34A being the communication port 34 is connected to the communication port 34 of another switching device 101 through the Ethernet cable 10. The communication port 34B being the communication port 34 is connected to the communication port 34 of a further switching device 101 different from this another switching device 101 through the Ethernet cable 10.

Figure 3:
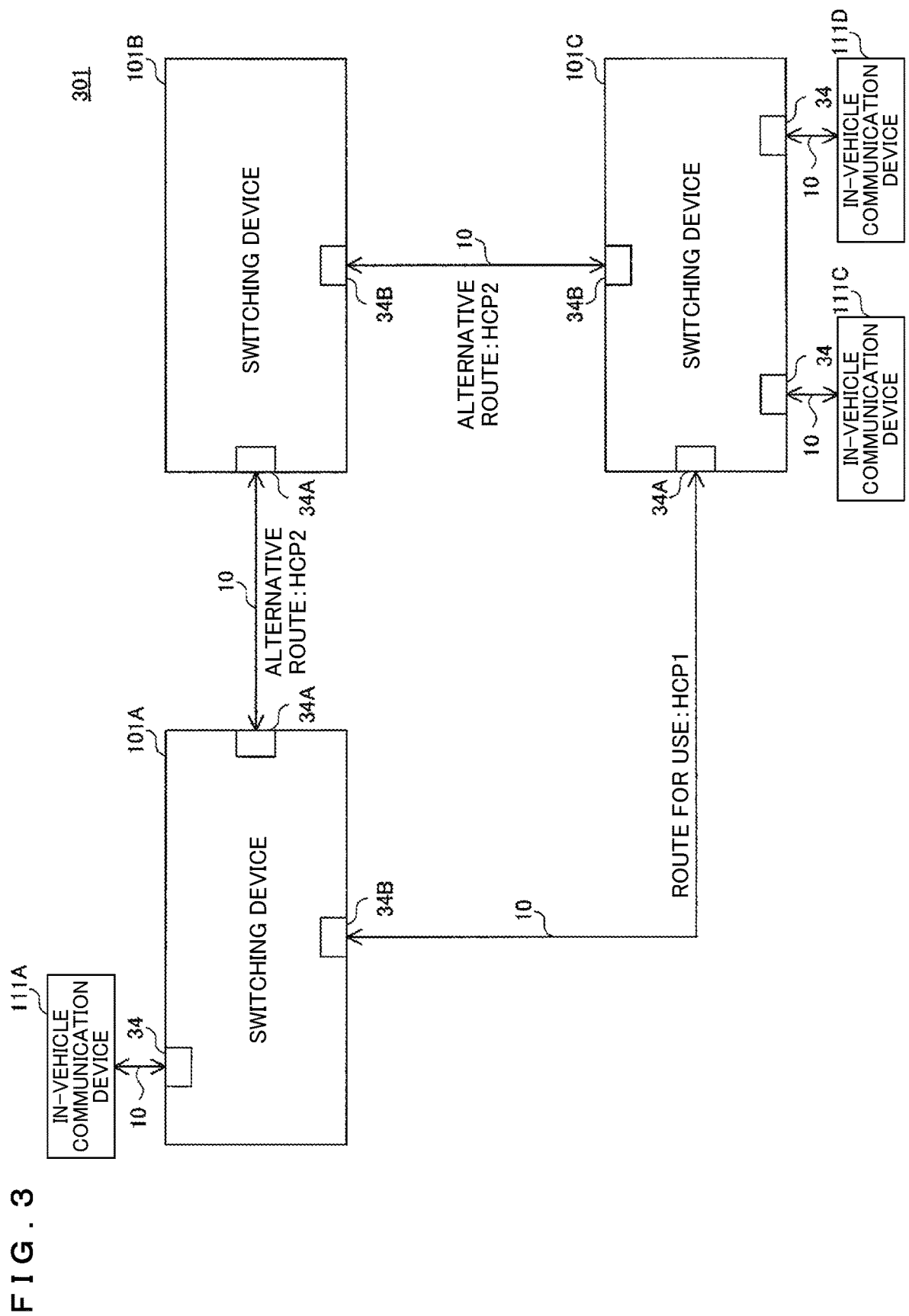
FIG. 3 illustrates the details of connections between the switching devices in the on-vehicle communication system according to Embodiment 1 of the present invention.

FIG. 3 illustrates the details of connections between the switching devices in the on-vehicle communication system according to Embodiment 1 of the present invention. FIG. 3 depicts the communication ports 34A and 34B used for communications between the switching devices 101 in each of the switching devices 101A-101C. In addition, FIG. 3 does not illustrate some parts of the in-vehicle communication devices 111, and illustrates none of the out-of-vehicle communication device 112, the central gateway 113 and the control device 114.

Referring to FIG. 3, the communication port 34A of the switching device 101A is connected to the communication port 34A of the switching device 101B through the Ethernet cable 10. The communication port 34B of the switching device 101A is connected to the communication port 34A of the switching device 101C through the Ethernet cable 10.

The communication port 34B of the switching device 101B and the communication port 34B of the switching device 101C are connected to each other through the Ethernet cable 10.

That is, a ring network is formed by the switching devices 101A-101C.

Referring again to FIG. 2, each of the communication ports 34 other than the communication ports 34A and 34B is connected to any one of the in-vehicle communication device 111, the out-of-vehicle communication device 112 and the central gateway 113 through the Ethernet cable 10.

The switching unit 31 is specifically a layer 2 (L2) switch and has a signal processing circuit for each communication port 34. Each signal processing circuit is assigned with a unique address, for example, a media access control (MAC) address. Each signal processing circuit can communicate with another switching device 101, the in-vehicle communication device 111, the out-of-vehicle communication device 112 and the central gateway 113 via the corresponding communication port 34.

Furthermore, the switching unit 31 of the switching device 101A may perform, for example, layer 3 (L3) routing. Note that the switching units 31 of the switching devices 101B and 101C may be configured to perform L3 routing.

The switching unit 31 transmits an Ethernet frame received from one device to another device according to a destination of the Ethernet frame.

More specifically, the switching unit 31 transmits the received Ethernet frame to another device based on the route designation information received from the control unit 32, and the transmission source address and the destination address included in the Ethernet frame.

Referring again to FIG. 3, when the switching unit 31 of the switching device 101A receives an Ethernet frame including the address of the in-vehicle communication device 111A as a transmission source address, which is the in-vehicle communication device 111 directly connected to the device 101A itself, and including the address of the in-vehicle communication device 111C as a destination address, which is the in-vehicle communication device 111 directly connected to the switching device 101C, it performs the following processing.

That is, if the route designation information includes information indicating that the Ethernet frame to be transmitted from the in-vehicle communication device 111A to the in-vehicle communication device 111C is to be directly transmitted to the switching device 101C, the switching unit 31 of the switching device 101A transmits the Ethernet frame to the switching device 101C via the communication port 34B.

If, on the other hand, the route designation information includes information indicating that the Ethernet frame to be transmitted from the in-vehicle communication device 111A to the in-vehicle communication device 111C is to be transmitted to the switching device 101C via the switching device 101B, the switching unit 31 of the switching device 101A transmits the Ethernet frame to the switching device 101B via the communication port 34A.

Referring again to FIG. 2, the switching unit 31 measures a reception signal quality for each of the communication ports 34. More specifically, the switching unit 31 measures a signal-to-noise ratio (SNR) of the received signal including the Ethernet frame, which is one example of a reception signal quality, for each communication port 34 and periodically, for example, outputs SNR information indicating the result of the measurement to the control unit 32. In this example, the larger the SNR value is, the less the SNR is, resulting in a better reception signal quality.

FIG. 4 illustrates one example of an SNR table held in a storage unit of the switching device according to Embodiment 1 of the present invention.

Referring to FIG. 4, the storage unit 33 is, for example, a nonvolatile memory, and holds correspondence of multiple temperatures of the device itself and criteria of judgment in the switching processing as to the reception signal quality. The switching processing will be described later.

More specifically, the storage unit 33 registers for each communication port 34 an SNR table ST1, which is one example of the above-described correspondence.

The SNR table ST1 includes each of the correspondence between the temperature Ta of the substrate 36 and a threshold Th1 for which switching processing is to be performed at the temperature Ta.

The SNR table ST1 is created by the following method, for example. The developer calculates a cyclic redundancy check (CRC) value based on the data included in the Ethernet frame received via a target communication port 34, for example. The developer compares the calculated CRC value and the value included in a frame check sequence field (hereinafter, also referred to as an FCS value) of this Ethernet frame.

The developer records the probability of occurrence of inconsistency between the CRC value and the FCS value while varying SNRs at a certain temperature Ta. The developer then employs the SNR for which the probability of occurrence of inconsistency is above a predetermined value as a threshold Th1 for the target communication port 34 at this temperature Ta.

The developer also determines a threshold Th1 at another temperature Ta as well and makes the SNR table ST1 completed.

Furthermore, the storage unit 33 registers, for example, route information depicting a connection topology of the devices in the on-vehicle communication system 301.

The control unit 32 performs switching processing for determining whether or not a port for use selected as a communication port 34 to be used is to be switched to the other communication port 34 based on the reception signal quality measured by the switching unit 31 for the port for use.

Here, the port for use is, for example, a communication port 34 designated by the route designation information. More specifically, for the switching device 101A illustrated in FIG. 3, if the route designation information includes information indicating that the Ethernet frame to be transmitted from the in-vehicle communication device 111A to the in-vehicle communication device 111C is to be directly transmitted to the switching device 101C, the communication port 34B serves as a port for use.

If the route designation information includes information indicating that the Ethernet frame to be transmitted from the in-vehicle communication device 111A to the in-vehicle communication device 111C is to be transmitted to the switching device 101C via the switching device 101B, the communication port 34A serves as a port for use.

It is noted that a port for use may fixedly or variably be implemented. If a port for use is variably implemented, the port for use may be changed depending on the transmission source and the destination of the Ethernet frame, for example. More specifically, the communication port 34B may be used as a communication port for use for the Ethernet frame transmitted from the in-vehicle communication device 111A to the in-vehicle communication device 111C, and the communication port 34A may be used as a port for use for the Ethernet frame transmitted from the in-vehicle communication device 111A to the in-vehicle communication device 111D being the in-vehicle communication device 111 directly connected to the switching device 101C.

The control unit 32 obtains the temperature of the switching device 101 of its own. More specifically, the control unit 32 receives temperature information from the temperature sensor 35.

The control unit 32 performs the switching processing described above based on, for example, the reception signal quality for a port for use, the obtained temperature and the SNR table ST1. In other words, the control unit 32 performs the switching processing described above using the reception signal quality for the port for use and the judgment criteria corresponding to the temperature Ta described above.

The control unit 32 recognizes a threshold Th1 for each communication port 34 based on the result of the measurement at the temperature Ta indicted by the temperature information received from the temperature sensor 35 and the SNR table ST1.

Moreover, based on the SNR information received from the switching unit 31, for example, the control unit 32 monitors the SNR of a signal received by the switching unit 31 via each of the communication ports 34, and updates status information indicating the result of the monitoring.

The control unit 32 obtains the reception signal quality for the communication port 34 of another switching device 101 and the SNR table ST1 if the SNR being monitored satisfies a predetermined condition C1, for example.

Here, the predetermined condition C1 corresponds to a case, for example, where the SNR being monitored is below the corresponding threshold Th1, where the SNR being monitored may be below the corresponding threshold Th1, and where a state in which the SNR being monitored is smaller than the corresponding threshold Th1 continues for a predetermined time period or the like.

The control unit 32 starts the following switching processing in the presence of an SNR satisfying the predetermined condition C1, for example.

The following describes the switching processing performed by the control unit 32 of the switching device 101A while the control units 32 of the respective switching devices 101B and 101C also perform switching processing as well.

A premise is set here that the SNR of the received signal at the communication port 34B of the switching device 101A satisfies the predetermined condition C1 for example (see FIG. 3).

Another premise is set here that exchange of Ethernet frames between the switching device 101A and the switching device 101C is performed via the communication port 34B of the switching device 101A and the communication port 34A of the switching device 101C.

Accordingly, the ports for use of the switching devices 101A and 101C respectively correspond to the communication ports 34B and 34A.

Hereafter, the route between the switching device 101A and the switching device 101C passing through the communication port 34B of the switching device 101A and the communication port 34A of the switching device 101C is also referred to as a route for use.

In the switching device 101A, the control unit 32 recognizes the route between the switching device 101A and the switching device 101C passing through the communication port 34A of the switching device 101A, the communication ports 34A and 34B of the switching device 101B and the communication port 34B of the switching device 101C as an alternative route based on the route information in the storage unit 33.

The control unit 32 then creates a health check packet HCP1 including the address corresponding to the communication port 34B of the switching device 101A as a transmission source address and the address corresponding to the communication port 34A of the switching device 101C as a destination address.

The control unit 32 also creates a health check packet HCP2 including the address corresponding to the communication port 34A of the switching device 101A as a transmission source address and the address corresponding to the communication port 34B of the switching device 101C as a destination address.

The control unit 32 transmits the created health check packet HCP1 via the communication port 34B and the created health check packet HCP2 via the communication port 34A.

In the switching device 101B, when receiving the health check packet HCP2 from the switching device 101A via the communication port 34A and the switching unit 31, the control unit 32 writes the SNR upon reception, the address of the communication port 34A, the temperature Ta and the corresponding SNR table ST1 into the data field of the health check packet HCP2. The control unit 32 then transmits the health check packet HCP2 via the switching unit 31 and the communication port 34B.

In the switching device 101C, receiving the health check packet HCP2 from the switching device 101B via the communication port 34B and the switching unit 31, the control unit 32 writes the SNR upon reception, the address corresponding to the communication port 34B, the temperature Ta and the corresponding SNR table ST1 into the data field of the health check packet HCP2.

The control unit 32 respectively rewrites the transmission source address and the destination address of the health check packet HCP2 to the address corresponding to the communication port 34B of the switching device 101C and the address corresponding to the communication port 34A of the switching device 101A, and then transmits the health check packet HCP2 via the switching unit 31 and the communication port 34B.

In the switching device 101B, when receiving the health check packet HCP2 from the switching device 101C via the communication port 34B and the switching unit 31, the control unit 32 writes the SNR upon reception, the address corresponding to the communication port 34B, the temperature Ta and the corresponding SNR table ST1 into the data field of the health check packet HCP2. The control unit 32 then transmits the health check packet HCP2 via the switching unit 31 and the communication port 34A.

In addition, in the switching device 101C, receiving the health check packet HCP1 from the switching device 101A via the communication port 34A and the switching unit 31, the control unit 32 writes the SNR upon reception, the address corresponding to the communication port 34A, the temperature Ta and the corresponding SNR table ST1 into the data field of the health check packet HCP1.

The control unit 32 then respectively rewrites the transmission source address and the destination address of the health check packet HCP1 to the address corresponding to the communication port 34A of the switching device 101C and the address corresponding to the communication port 34B of the switching device 101A, and then transmits the health check packet HCP1 via the switching unit 31 and the communication port 34A.

In the switching device 101A, the control unit 32 receives the health check packet HCP2 via the communication port 34A and the switching unit 31, and receives the health check packet HCP1 via the communication port 34B and the switching unit 31.

The control unit 32 performs switching processing further based on the obtained SNR, the temperature Ta and the SNR table ST1 for the communication port 34 of another switching device 101.

More specifically, the control unit 32 determines which one is superior in communication quality, the route for use or the alternative route based on the contents written in the data fields of the respective health check packets HCP1 and HCP2.

More specifically, the control unit 32, for example, collects a difference between an SNR upon reception of the health check packet HCP2 in the route for use and the threshold Th1 corresponding to the temperature Ta, and thereby scores the communication quality of the route for use.

The control unit 32, for example, collects a difference between an SNR upon reception of the health check packet HCP1 in the alternative route and the threshold Th1 corresponding to the temperature Ta, and thereby scores the communication quality of the alternative route as well.

The control unit 32 judges that the communication quality of the route for use is superior to that of the alternative route if the score of the route for use is higher than that of the alternative route, and determines that the port for use is to be remained unchanged from the communication port 34B.

In contrast thereto, the control unit 32 judges that the communication quality of the alternative route is superior to that of the route for use if the score of the route for use is lower than that of the alternative route, and determines that the port for use is to be changed from the communication port 34B to the communication port 34A.

The control unit 32 then creates route designation information indicating that the Ethernet frame to be transmitted from the in-vehicle communication device 111A to the in-vehicle communication device 111C is to be transmitted to the switching device 101C via the switching device 101B and outputs the created route designation information to the switching unit 31.

The control unit 32 records a log of the processing every time the switching processing is performed, for example.

[Operation]

Each of the devices in the on-vehicle communication system 301 includes a computer, and the arithmetic processing unit such as a CPU or the like in the computer reads out a program including a part or all of the steps in a sequence diagram or flowchart described below from a memory (not illustrated) and executes it. Each of the programs of these multiple devices may externally be installed.

Each of the programs of these multiple devices is made commercially available in such a manner as to be stored in a recording medium.

Figure 5:
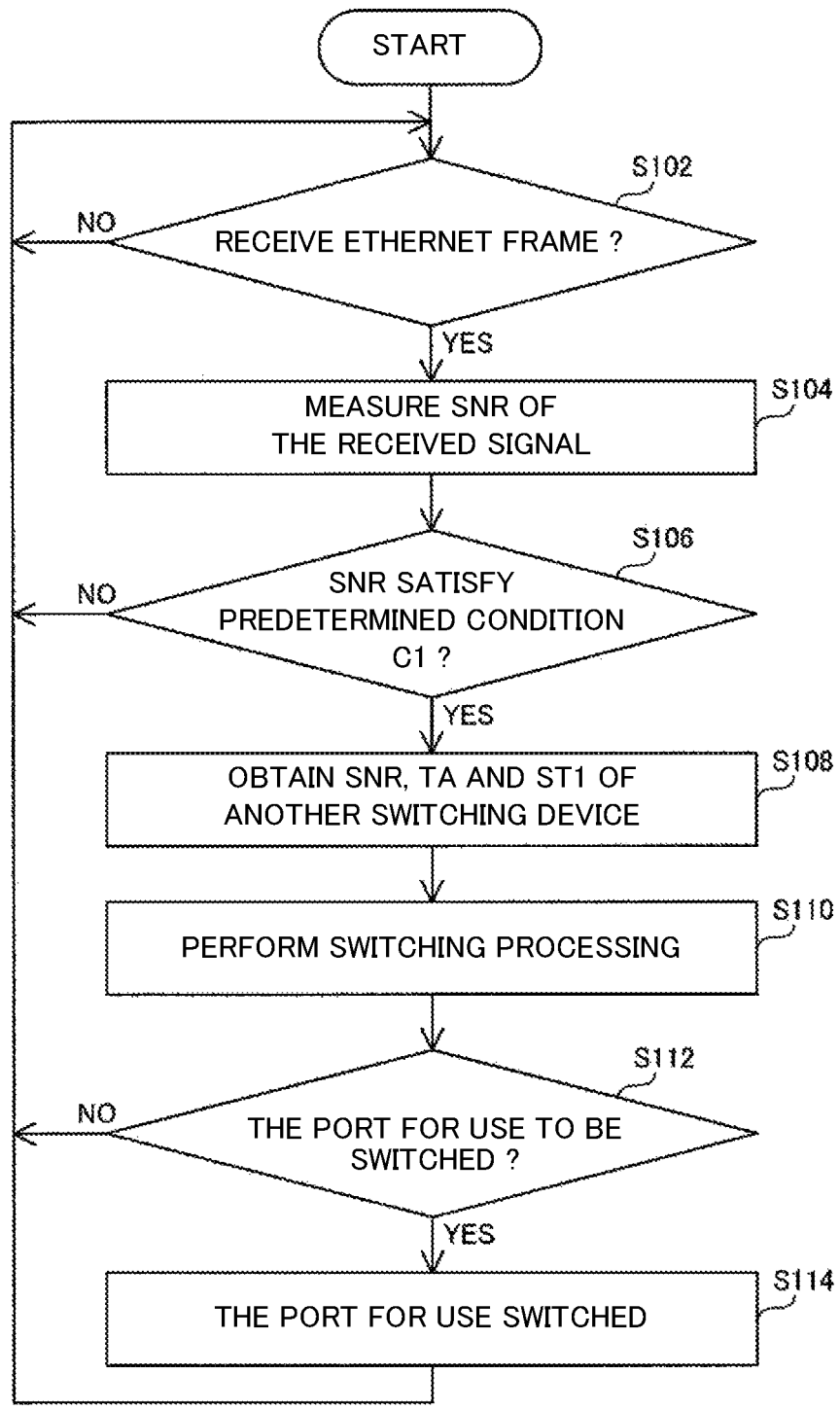
FIG. 5 is a flowchart defining an operation procedure performed when the switching device in a monitoring system according to Embodiment 1 of the present invention performs switching processing.

FIG. 5 is a flowchart defining an operation procedure when the switching device in a monitoring system according to Embodiment 1 of the present invention performs switching processing.

Referring to FIG. 5, the switching device 101 is first held on standby until it receives an Ethernet frame from another device (NO at step S102).

When receiving an Ethernet frame from another device (YES at step S102), the switching device 101 then measures an SNR of the received signal of the Ethernet frame (step S104).

Next, if the measured SNR of the received signal satisfies the predetermined condition C1 (YES at step S106), the switching device 101 transmits a health check packet to another switching device 101 to thereby obtain the SNR, the temperature Ta and the SNR table ST1 of this another switching device 101 (step S108).

Succeedingly, the switching device 101 performs switching processing based on the SNR, the temperature Ta and the SNR table ST1 of a received signal of the device itself and the SNR, the temperature Ta and the SNR table ST1 of another switching device 101 (step S110).

If determining that the port for use is to be switched to another communication port 34 (YES at step S112), the switching device 101 then switches the port for use to this another communication port 34 (step S114).

Next, if the measured SNR of the received signal does not satisfy the predetermined condition C1 (NO at step S106), if the port for use is determined not to be switched to another communication port 34 (NO at step S112), or if the port for use is switched to this another communication port 34 (step S114), the switching device 101 is held on standby until it receives a new Ethernet frame from another device (NO at step S102).

It is noted that the on-vehicle communication system according to Embodiment 1 of the present invention is configured to include the switching devices 101A, 101B and 101C, although the number of switching devices is not limited thereto. The on-vehicle communication system 301 may be configured to include four or more switching devices 101.

In addition, the switching device according to Embodiment 1 of the present invention is configured to include three or more communication ports 34, although the number of communication ports 34 is not limited thereto. The switching device 101 may be configured to include two communication ports 34.

Furthermore, the switching device according to Embodiment 1 of the present invention is configured to perform switching processing based on, but not limited to, the SNR of a received signal for the port for use, the temperature Ta and the SNR table ST1 as well as the SNR of a received signal for each of the ports 34, the temperature Ta and the SNR table ST1 in the another switching device 101. The control unit 32 may be configured to perform switching processing based on the SNR of a received signal for the port for use. More specifically, the control unit 32 performs switching processing based on whether the SNR of a received signal for the port for use is greater than a predetermined threshold or not. Moreover, the control unit 32 may be configured to perform switching processing based on the SNR of a received signal for the port for use, the temperature Ta and the SNR table ST1.

Furthermore, the switching device according to Embodiment 1 of the present invention is configured to register, but not limited to, the SNR table ST1 in the storage unit 33 for each communication port 34. The switching device 101 may be configured to register an SNR table ST1 common to the communication ports 34 in the storage unit 33.

Moreover, the switching device according to Embodiment 1 of the present invention is configured to use, but not limited to, the temperature Ta of the substrate 36 for switching processing. The switching device 101 may be configured to use the temperature of the control unit 32, the temperature of the switching unit 31 and so on for the switching processing.

Additionally, applying the redundant configuration described in Patent Document 1 to an on-vehicle network is conceivable, for example. Due to limitation of space in a vehicle, however, a noise source such as an engine, a motor and so on and signal lines may be arranged close to each other.

Such an arrangement may sharply deteriorate a communication environment depending on the operation of the noise source. For example, the noise level of a signal to be transmitted by a signal line rapidly increases, resulting in degradation of communication quality. In this case, communication may become difficult, which is unpreferable. Thus, a technique is required for appropriately performing redundant switching in the on-vehicle network depending on the communication environment.

In contrast thereto, the on-vehicle communication system according to Embodiment 1 of the present invention is mounted on a vehicle. The switching devices 101A, 101B and 101C each include the communication ports 34A and 34B. The communication ports 34A and 34B of the switching device 101A are respectively connected to the communication port 34A of the switching device 101B and the communication port 34A of the switching device 101C. The communication port 34B of the switching device 101B and the communication port 34B of the switching device 101C are connected to each other. Each of the switching devices 101A, 101B and 101C measures a reception signal quality for the communication port 34A of the device itself and a reception signal quality for the communication port 34B of the device itself. Each of the switching devices 101A, 101B and 101C performs switching processing for determining whether or not a port for use that is being selected as a communication port 34 to be used out of the communication ports 34A and 34B of the device itself is to be switched to the other communication port 34 based on the reception signal quality for the port for use.

According to such a configuration that the reception signal qualities for the communication ports 34A and 34B are measured in each of the switching devices 101, if deterioration in the reception signal quality of a signal for a port for use is detected due to increase in a noise level, by appropriately determining that the port for use is to be switched to the other communication port 34, the port for use can be switched to the other communication port 34.

Redundant switching for switching the communication route passing through the port for use to a communication route passing through the other communication port 34 can appropriately be performed, which makes it possible to prevent a situation where communication continues to be difficult. Accordingly, it is possible to appropriately perform redundant switching in the on-vehicle network.

Furthermore, in the on-vehicle communication system according to Embodiment 1 of the present invention, each of the switching devices 101A, 101B and 101C holds correspondence of multiple temperatures Ta of the device itself and criteria of judgment in the switching processing as to the reception signal quality. Each of the switching devices 101A, 101B and 101C then obtains the temperature of the device itself and performs the switching processing further based on the obtained temperature and the correspondence.

According to such a configuration, if a lower limit of the SNR capable of well performing signal processing of a received signal varies depending on the temperature, the criteria of judgment depending on the temperature of the switching device 101 can be obtained from the above-described correspondence. Thus, if it is difficult to well perform the above-described signal processing, it is possible to determine that a port for use is to be switched to the other communication port 34.

Additionally, in the on-vehicle communication system according to Embodiment 1 of the present invention, each of the switching devices 101A, 101B and 101C holds correspondence for each communication port 34.

According to such a configuration, if the temperature change of the lower limit of the SNR capable of well performing signal processing of a received signal varies from one communication port 34 to another, the criteria of judgment can be obtained from the above-described correspondence depending on the temperature of the switching device 101 for each communication port 34.

In the on-vehicle communication system according to Embodiment 1 of the present invention, each of the switching devices 101A, 101B and 101C obtains a reception signal quality and the correspondence for the communication port 34 of another switching device 101, and performs the switching processing further based on the obtained reception signal quality and correspondence.

Such a configuration can determine whether or not signal processing of the received signal in another switching device 101 is well performed, so that it is possible to systematically determine which one is superior, the communication route passing through this another switching device 101 to a target switching device 101 or the communication route bypassing this another switching device 101 and reaching the target switching device 101.

In addition, the switching device 101 according to Embodiment 1 of the present invention is mounted on a vehicle. The switching unit 31 measures the reception signal qualities for the multiple communication ports 34. The control unit 32 performs switching processing for determining whether or not a port for use that is being selected as a communication port 34 to be used is to be switched to another one of the communication ports 34 based on the reception signal quality measured by the switching unit 31 for the port for use.

According to such a configuration that the reception signal qualities for the communication ports 34 of each of switching devices 101 are measured, if reduction in the reception signal quality is detected due to increase in the noise level of a signal for the port for use, by appropriately determining that the port for use is to be switched to another one of the communication ports 34, the port for use can be switched to this another one of the communication ports 34. The redundant switching for switching the communication route passing through the port for use to a communication route passing through another communication port 34 can appropriately be performed, which makes it possible to prevent a situation where communication continues to be difficult. Accordingly, it is possible to appropriately perform redundant switching in the on-vehicle network.

The following describes another embodiment of the present invention with reference to the drawings thereof. Note that the same or corresponding parts are denoted by the same reference codes in the drawings to avoid repetitive descriptions therefor.

Embodiment 2

The present embodiment relates to an on-vehicle communication system including switching devices connected by cables in addition to the Ethernet cables as compared to the on-vehicle communication system according to Embodiment 1. The contents other than the following description are similar to those of the on-vehicle communication system according to Embodiment 1.

Figure 6:
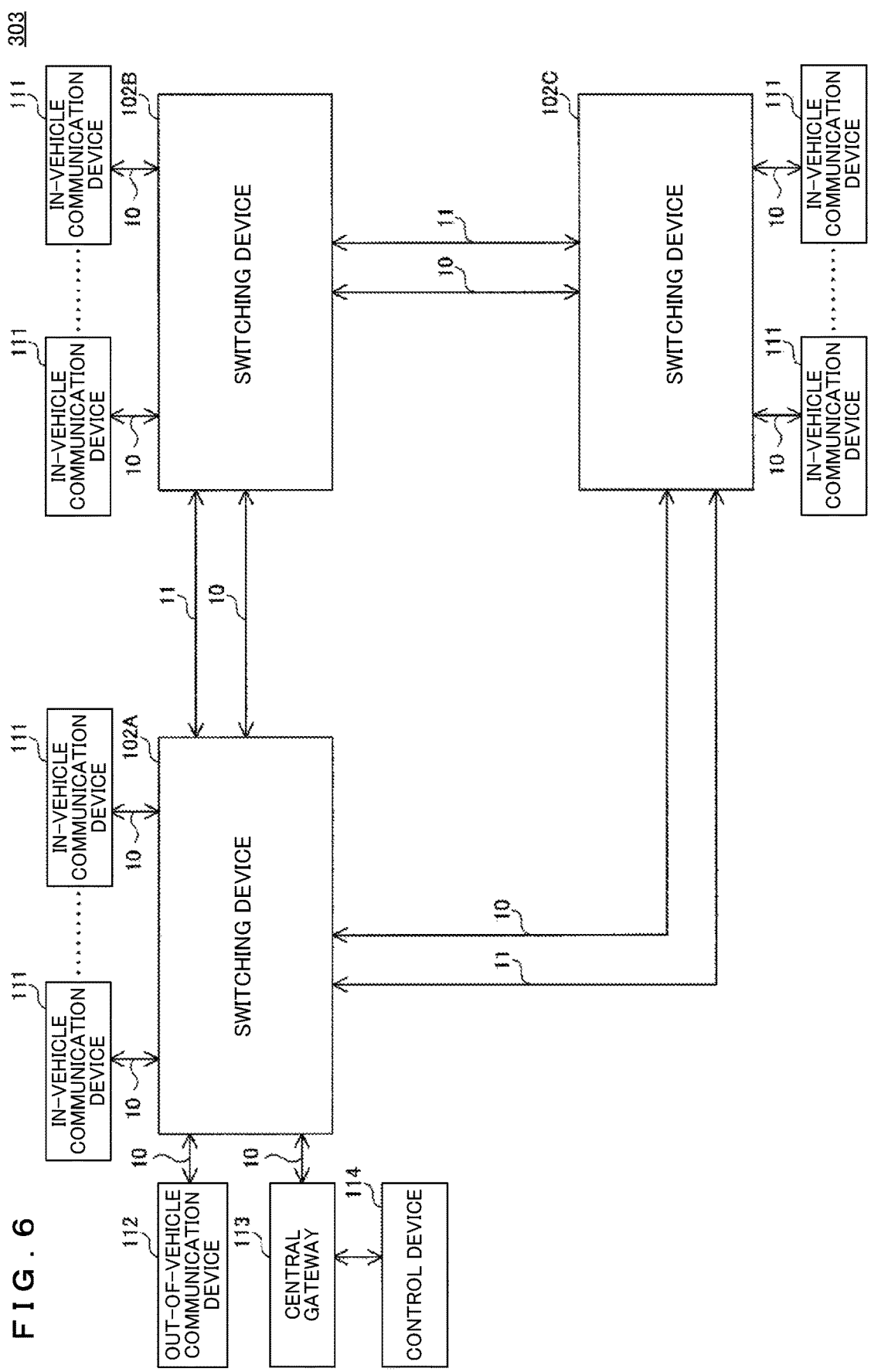
FIG. 6 illustrates an example of the configuration of an on-vehicle communication system according to Embodiment 2 of the present invention.

FIG. 6 illustrates an example of the configuration of an on-vehicle communication system according to Embodiment 2 of the present invention.

Referring to FIG. 6, the on-vehicle communication system 302 includes switching devices 102A, 102B and 102C. Hereafter, each of the switching devices 102A, 102B and 102C may also be referred to as a switching device 102.

An in-vehicle communication device 111, an out-of-vehicle communication device 112, a central gateway 113 and a control device 114 illustrated in FIG. 6 are respectively similar in operation to the in-vehicle communication device 111, the out-of-vehicle communication device 112, the central gateway 113 and the control device 114 illustrated in FIG. 1.

Communication ports 34 of the switching device 102A, the switching device 102B and the switching device 102C are connected through Ethernet cables 10, for example.

The switching device 102A, the switching device 102B and the switching device 102C are further connected through cables for serial communication (hereinafter, also referred to as serial cables) 11, for example.

[Configuration of Switching Device 102]

FIG. 7 illustrates an example of the configuration of a switching device in the on-vehicle communication system according to Embodiment 2 of the present invention.

Referring to FIG. 7, the switching device 102 includes a switching unit (measurement unit) 31, a control unit (switching processing unit) 42, a storage unit 33, multiple communication ports 34 and a temperature sensor 35.

The switching unit 31, the storage unit 33, the communication ports 34 and the temperature sensor 35 in the switching device 102 are respectively similar in operation to the switching unit 31, the storage unit 33, the communication ports 34 and the temperature sensor 35 in the switching device 101 illustrated in FIG. 2.

The serial cable 11 is connected to the control unit 42. More specifically, the control unit 42 is connected to the control unit 42 of another switching device 102 through the serial cable 11.

The control unit 42 makes serial communication with the control unit 42 of another switching device through the serial cable 11.

Specifically, the control unit 42 transmits information used for determination of switching including status information, a temperature Ta and an SNR table ST1 in the storage unit 33 to another switching device 102 through the serial cable 11 and obtains information used for determination of switching of another switching device 102 through the serial cable 11 from this another switching device 102.

More specifically, the control unit 42 obtains the information used for determination of switching from another switching device 102 through the serial cable 11 if the SNR of an object to be monitored indicated by the status information satisfies a predetermined condition C1.

The control unit 42 performs the switching processing based on the information used for determination of switching of its own switching device 102 and the information used for determination of switching obtained from another switching device 102, for example.

As described above, in the on-vehicle communication system according to Embodiment 2 of the present invention, the communication ports 34 of the switching device 102A, the switching device 102B and the switching device 102C are connected through the cables for Ethernet communication. The switching device 102A, the switching device 102B, and the switching device 102C are further connected through the cables for serial communication.

According to such a configuration, the reception signal quality and the correspondence for the communication port 34 of another switching device 102 can be surely obtained through the dedicated serial communication cables, which enables prompt switching processing.

Since the other configurations and operation are similar to those of the on-vehicle communication system according to Embodiment 1, the detailed description thereof will not be repeated here.

Noted that parts or all of the components and operation of the devices according to Embodiment 1 and Embodiment 2 of the present invention may appropriately be combined.

It is to be understood that the embodiments disclosed here is illustrative in all respects and not restrictive. The scope of the present invention is defined by the appended claims, and all changes that fall within the meanings and the bounds of the claims, or equivalence of such meanings and bounds are intended to be embraced by the claims.

It is to be noted that, as used herein and in the appended claims, the singular forms "a", "an", and "the" include plural referents unless the context clearly dictates otherwise.

The above description includes features of clauses described below.

[Clause 1]

An on-vehicle communication system mounted on a vehicle, comprising:

a first switching device, a second switching device and a third switching device each including a first communication port and a second communication port, wherein the first communication port and the second communication port of the first switching device are respectively connected to the first communication port of the second switching device and the first communication port of the third switching device, the second communication port of the second switching device and the second communication port of the third switching device are connected to each other, each of the first switching device, the second switching device and the third switching device measures a reception signal quality for the first communication port of the device itself and a reception signal quality for the second communication port of the device itself, each of the first switching device, the second switching device and the third switching device performs switching processing for determining whether or not a port for use that is being selected as a communication port to be used out of the first communication port and the second communication port of the device itself is to be switched to another one of the communication ports based on the reception signal quality for the port for use, and each of the first switching device, the second switching device and the third switching device measures a signal-to-noise ratio (SNR) of the first communication port of the device itself and an SNR of the second communication port of the device itself and performs the switching processing based on the SNR of the port to be used.

[Clause 2]

A switching device mounted on a vehicle, comprising:

a plurality of communication ports;

a measurement unit that measures a reception signal quality for each of the communication ports; and a switching processing unit that performs switching processing for determining whether or not a port for use that is being selected as a communication port to be used is to be switched to another one of the communication ports based on the reception signal quality measured by the measurement unit for the port for use, wherein the measurement unit measures an SNR for each of the communication ports, and the switching processing unit performs the switching processing based on the SNR of the port to be used.

The invention claimed is:

1. An on-vehicle communication system mounted on a vehicle, comprising: a first switching device, a second switching device and a third switching device each including a first communication port and a second communication port, wherein the first communication port and the second communication port of the first switching device are respectively connected to the first communication port of the second switching device and the first communication port of the third switching device, the second communication port of the second switching device and the second communication port of the third switching device are connected to each other, each of the first switching device, the second switching device and the third switching device measures a reception signal quality for the first communication port of the device itself and a reception signal quality for the second communication port of the device itself, each of the first switching device, the second switching device and the third switching device obtains a temperature of itself, one of the first communication port and the second communication port is selected as a port for use which should be used for communication in each of the first switching device, the second switching device and the third switching device, and each of the first switching device, the second switching device and the third switching device performs switching processing for determining whether or not the port for use is to be switched to another communication port based on the reception signal quality of the first communication port and the second communication port and the obtained temperature.

2. The on-vehicle communication system according to claim 1, wherein each of the first switching device, the second switching device and the third switching device holds correspondence between a plurality of temperatures of the device itself and judgement criteria in the switching processing as to the reception signal quality, and performs the switching processing further based on the obtained temperature and the correspondence.

3. The on-vehicle communication system according to claim 2, wherein each of the first switching device, the second switching device and the third switching device holds the correspondence for each of the communication ports.

4. The on-vehicle communication system according to claim 2, wherein each of the first switching device, the second switching device and the third switching device obtains the reception signal quality for the communication port and the correspondence in another switching device, and performs the switching processing further based on the obtained reception signal quality and the obtained correspondence.

5. The on-vehicle communication system according to claim 4, wherein
the communication ports of the first switching device, the second switching device and the third switching device are further connected with one another through cables for Ethernet communication, and
the first switching device, the second switching device and the third switching device are connected with one another through cables for serial communication.

6. A switching device mounted on a vehicle, comprising:
a plurality of communication ports;
a measurement unit that measures a reception signal quality for each of the communication ports; and
a temperature sensor that detects a temperature of the switching device, wherein
one of the communication ports is selected as a port for use which should be used for communication, and
the switching device further comprises a switching processing unit that performs switching processing for determining whether or not the port for use is to be switched to another communication port based on the reception signal quality measured by the measurement unit for the communication ports and the temperature detected by the temperature sensor.

7. An on-vehicle communication method in an on-vehicle communication system mounted on a vehicle,
the on-vehicle communication method comprises:
selecting one of a first communication port and a second communication port as a port for use which should be used for communication in each of a first switching device, a second switching device and a third switching device included in the on-vehicle communication system, the first communication port and the second communication port of the first switching device connected to the first communication port of the second switching device and the first communication port of the third switching device, respectively, and the second communication port of the second switching device and the second communication port of the third switching device connected each other;
measuring, by each of the first switching device, the second switching device and the third switching device, a reception signal quality for the first communication port of the device itself and a reception signal quality for the second communication port of the device itself;
obtaining, by each of the first switching device, the second switching device and the third switching device, a temperature of itself, and
performing, by each of the first switching device, the second switching device and the third switching device, switching processing for determining whether or not the port for use is to be switched to another communication port based on the reception signal quality for the first communication port and the second communication port and the obtained temperature.

* * * * *